June 4, 1940.                H. C. GRANT, JR                 2,203,626
                              DISPENSING DEVICE
                           Filed Dec. 31, 1937              4 Sheets-Sheet 2

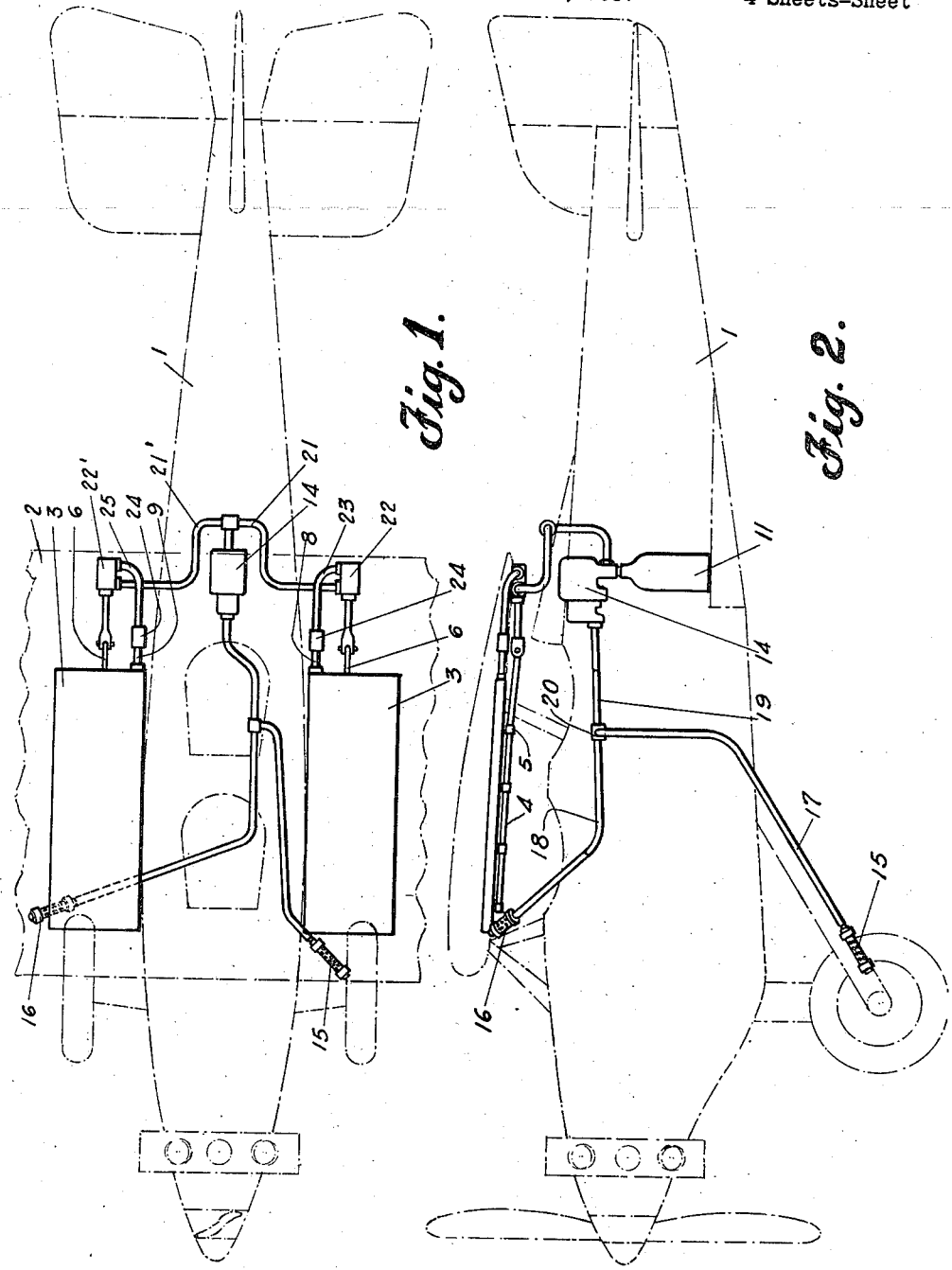

INVENTOR
Harry C. Grant, Jr.
BY
J. William Carson
ATTORNEY

June 4, 1940.

H. C. GRANT, JR 2,203,626

DISPENSING DEVICE

Filed Dec. 31, 1937

INVENTOR
Harry C. Grant, Jr.
BY
J. William Carson
ATTORNEY

June 4, 1940.  H. C. GRANT, JR  2,203,626
DISPENSING DEVICE
Filed Dec. 31, 1937     4 Sheets-Sheet 4

INVENTOR
Harry C. Grant, Jr.
BY
J. William Carson
ATTORNEY

Patented June 4, 1940

2,203,626

UNITED STATES PATENT OFFICE 2,203,626

DISPENSING DEVICE

Harry Campbell Grant, Jr., New York, N. Y., assignor to Specialties Development Corporation, Bloomfield, N. J., a corporation of New Jersey Application December 31, 1937, Serial No. 182,750

14 Claims. (Cl. 221—73.5)

The present invention relates to flotation systems for aircraft of the type comprising an arrangement wherein inflatable bags are provided on the aircraft and are adapted to be inflated automatically with a buoyant fluid when the aircraft descends upon a body of water. When inflated, the bags form buoyant floats for supporting the aircraft and prevent it from sinking.

Aircraft flotation apparatus of the type referred to, and which is currently in quite general use, comprises a container in which the buoyant fluid is stored under pressure, and a releasing or control head secured to the container including a frangible disc closure and a closure piercing member which becomes dynamically operative as soon as the aircraft comes in contact with a body of water, thus releasing the buoyant medium; said piercing member being normally energized by a coiled spring held in restraint by a series of interengaging levers which successively reduce the operating force to a point where the outermost lever of the series is releasable by a small operating pressure developed upon immersion of an actuator in water. Releasing or control heads of this type usually include a manual reset for the spring energized piercing member and the lever system, and at the same time take the form of an integrally inviolate structure.

Such automatically operable apparatus, although it has proved satisfactory, is complicated and costly, requiring great care and accuracy in the manufacture of the numerous parts, as well as careful handling in installation and maintenance; and there has been a progressive tendency to develop ever more reliable, quick acting and compact systems, none the less automatically operable, but of simpler and more rugged construction.

It is accordingly an object of the present invention to provide an automatically operable aircraft flotation system which is of simple and rugged construction, and which is at the same time reliable, quick acting and compact.

It is another object of this invention to provide an aircraft flotation system which operates mechanically as soon as the aeroplane alights upon water.

Another object of the invention is to provide an aircraft flotation system which will reliably operate in the above manner regardless of whether the aircraft alights into the water in an upright or in an inverted position.

A further object is to provide an aircraft flotation system of the above type wherein the various elements are so designed as to be incapable of being reset after operation without replacement of essential parts.

A still further object of the invention is to provide a flotation system which is rugged and yet sensitive in its response to its actuating conditions; that is, which will become operative as the result of a small initial actuating force, but which will not operate as a result of jars or other disturbances.

Still another object of the invention is to provide a flotation system which upon descent of the aircraft upon water will become operative instantaneously and positively.

Another object of the invention is to provide a flotation system which will afford the maximum exchangeability of integral parts.

A further object is to provide a unitary self-contained exchangeable explosion operated valved container structure relative to the explosion initiating means.

In the preferred form of the invention a buoyant fluid is contained in a pressure container sealed by a frangible disc adapted to be cut by a cutter-projectile normally supported out of contact with the disc closure, but operable to be shot bullet-like through the disc by means made operative upon pressure being set up, upon immersion in water of an actuator member designed to build up an actuating pressure in a volume of air trapped when the actuator is immersed in water.

While the apparatus in accordance with the present invention is in general quite similar to that disclosed by Letters Patent of the United States No. 2,052,186, it will be found to differ therefrom more particularly in the provision of the novel and positive means for automatically releasing the buoyant fluid from its container, and in the combination of elements which comprise the flotation system.

Further objects and features of the invention, not specifically enumerated above, will be apparent as the invention is described in greater detail in connection with the accompanying drawings, wherein:

Figure 1 is a plan view showing flotation equipment constructed in accordance with the present invention and applied to an aeroplane which is indicated in dot and dash lines.

Figure 2 is a view in side elevation showing the equipment of Figure 1 and likewise the aeroplane upon which it is installed, the aeroplane being shown in dot and dash lines.

Figure 3:
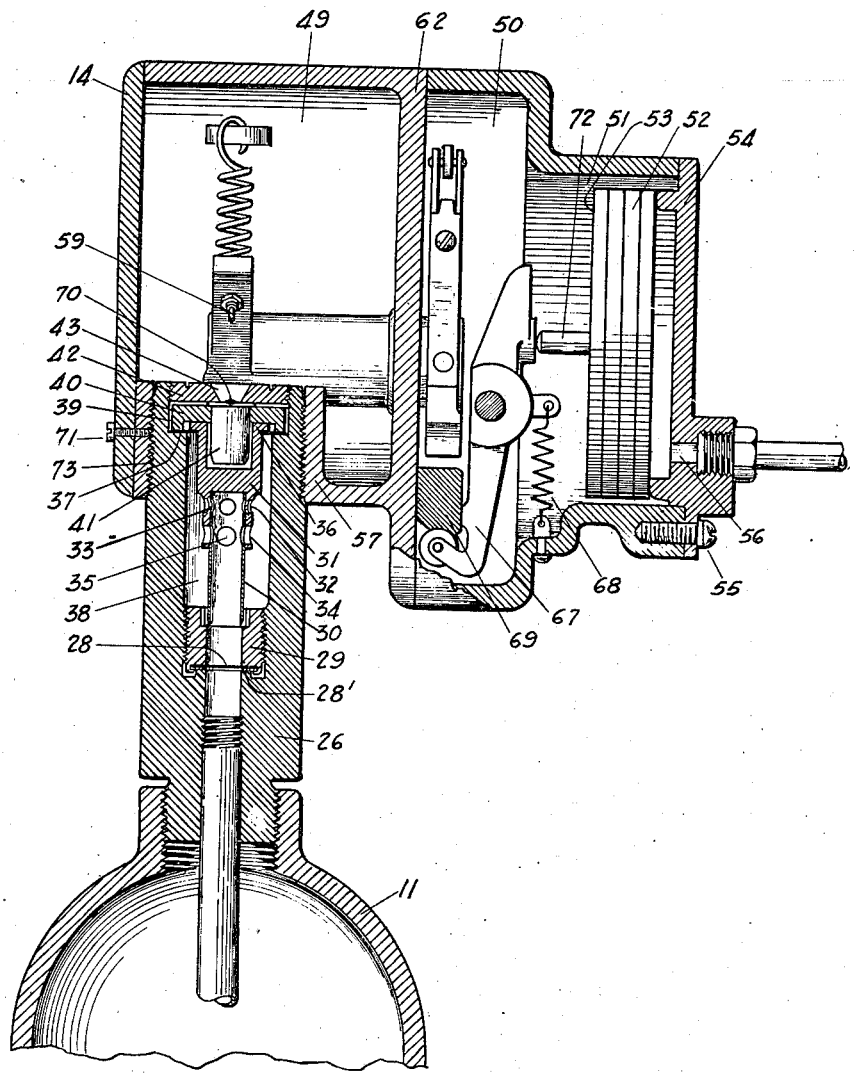
Figure 3 is a view partly in transverse section, showing a container and its releasing mechanism in accordance with the present invention, the section being taken on the line 3—3 of Figure 4 and looking in the direction of the arrows.

Referring to Figures 1 and 2 of the above drawings, an aeroplane fuselage is indicated at 1, and the wing of the aeroplane at 2. On the underneath side of the wing and within the streamline of the wing are set flotation bag containers 3, each containing a normally deflated flotation bag retained within the container by means of wires 4 which pass through ringlets 5 to maintain the cover of each container closed. In order that the flotation bags may be secured effectively to the plane, rope loops are secured to the bags and in turn to the structure of the wing of the plane. A cable or rod 6 operates all of the wires 4 to disengage the ringlets 5, thus enabling a container 3 to be opened. When, therefore, a flotation bag is inflated by a compressed fluid, such as air or carbon dioxide, the bag expands and frees itself from the container, the cover being so constructed as to permit the bag to assume its inflated position. For the purpose of expanding the flotation bags, conduits 8 and 9 are connected to the respective bags, the conduits being connected to an outlet of the pressure medium container 11.

The pressure medium container 11 is provided with a releasing mechanism 14, described in detail hereinafter, the mechanism being actuated by pressure developed upon immersion in water of one of the actuator members 15 or 16, the operating pressure being transmitted to the releasing mechanism of the container through either the tube 17 or the tube 18, both of which are connected to the pressure inlet connection 19 through a special fitting 20, forming no part of the present invention, which fitting prevents pressure developed by the actuator 15 from escaping through the actuator 16, at the same time preventing pressure developed by the actuator 16 from escaping through the actuator 15.

Upon release of the medium within the pressure medium container 11, it passes through discharge lines 21 and 21' into one end of piston bag releases 22 and 22', driving the pistons toward the right, as viewed in Figures 1 and 2, and disengaging the wires 4 from the ringlets 5. When the pistons in piston bag releases 22 and 22' reach the end of their stroke, the medium escapes through conduits 23 and 25, check valves 24, and conduits 8 and 9 into the flotation bags, thus causing them to expand in accordance with the pressure of the medium. During the inflation of the bags, the covers of the containers 3, containing such bags, lift so as to permit the free inflation of the bags. By providing a check valve as indicated at 24, the medium which has expanded into the flotation bags is prevented from escaping therefrom, continued passage of the medium into the bags being freely permitted.

Figure 4:
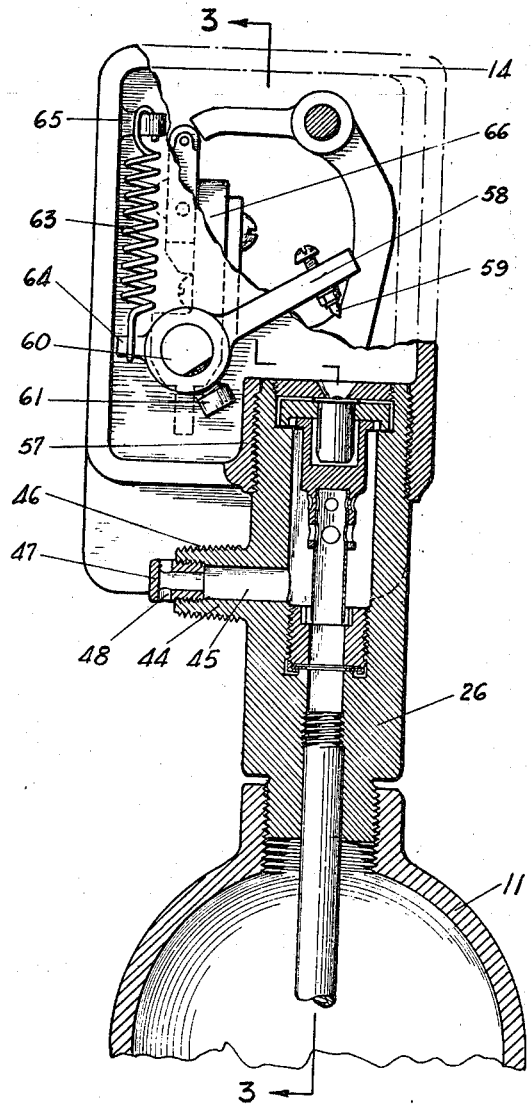
Figure 4 is a view, also partly in section, of the subject of Figure 3 turned on its vertical axis by 90°, this view showing details of construction in several planes.

Referring now to Figures 3 and 4 of the drawings, a container 11 is provided, within which a supply of a medium under pressure, usually compressed carbonic acid, is maintained by means of a valve body 26, threaded into the top of the container 11, and a frangible disc closure 28 and sealing gasket 28' secured in position by a plug 29 threaded into valve body 26. A hollow cutter 30 is movable within the plug 29, the cutter being clinched into a coupling member 31 by punching in circular depressions 32 on the outside of the coupling member which are in line with openings 33 in the wall of cutter 30. Openings 34 in the coupling member 31 are in alinement with corresponding openings 35 in the cutter, and serve as discharge passages for the medium. The flange-formed end 36 of the cup-shaped upper portion of the coupling member, resting on a readily deformable metallic washer 37, serves as a suspension support for the cutter assembly. The chamber 38 of the valve body 26 is enlarged at 39 to permit the reception at its bottom of the supporting washer 37 and resting on it, on an annular flange, a centrally bored support 40 which carries a blank cartridge 41 protruding downwardly through said central bore into the cup-shaped upper portion of the coupling member 31. A screw plug 42, threaded into the upper part of enlargement 39, serves to firmly secure the cartridge and cutter assemblies as well as to seal the chamber 38 against the escape of the pressure medium. A central funnel-shaped bore 43 in the screw plug 42 exposes the percussion point 70 of the cartridge 41 to the action of a firing pin 59. The boss 44 (Figure 4), formed on the valve body 26, is centrally bored to form an escape passage 45 for the gas in container 11, threads 46 providing for attachment of an outlet conduit, while the recoil preventing outlet plug 47 threaded into passage 45 serves to eliminate any recoil effect due to the escape of the high pressure medium at a time when the outlet conduit (not shown in Figures 3 and 4) is removed, the passages 48 serving to produce opposed balanced jets of the pressure medium.

The release actuating mechanism 14 is shown threadedly secured at 73 as a unit to the top of valve body 26, in which 49 is a cartridge chamber, 50 a lever chamber, and 51 an extension of the lever chamber containing a bellows-like member 52 provided with a closed end 53 and supported on its open end by means of an airtight connection with the closing member 54, secured to lever chamber extension 51 by screws 55, the member 52 carrying the actuating pin 72. A passage 56 in the member 54 communicates with the interior of the bellows-like member 52 and is adapted to be connected to the actuators 15 and 16, as already described. Set screw 71 serves to maintain in a fixed relation the threaded cooperation between valve body 26 and release housing 14.

Mounted within one corner of the cartridge chamber 49 is a boss 57 bored out to receive the upper portion of valve body 26, referred to above. A lever 58 carrying a firing pin 59 which is adapted to detonatingly strike the blank cartridge 41 secured within valve body 26, is mounted on a spindle 60 by means of a set screw 61, the spindle passing through the wall 62 between the cartridge chamber 49 and the lever chamber 50 into the lever chamber. A relatively heavy coiled tension spring 63 is arranged to engage a lug 64 on the lever 58 and another lug 65 mounted on a side wall of the cartridge chamber, the tendency of the spring 63 being to normally urge rotation of the lever 58 in a clockwise direction as viewed in Figure 4.

In order to normally restrain rotation of the lever 58, a lever system is provided in the lever chamber 50, the first lever of the system being shown at 66, said lever being secured to the end of the spindle 60 projecting within the lever chamber, and the last lever of the system being shown at 67, a coiled spring 68 tending to maintain the lever 67 normally in engagement with the lever 69. The details of the lever system itself do not form a part of the invention, and inasmuch as any suitable lever system may be employed, so long as it serves to reduce by successive steps the amount of force required to release the spring energized lever 58, the various parts of the present lever system will not be gone into. Suffice it to say that in mechanisms of this character, it is highly desirable that the elements thereof be responsive to extremely slight differences of pressure, such as a six-inch head of water.

Figure 5:
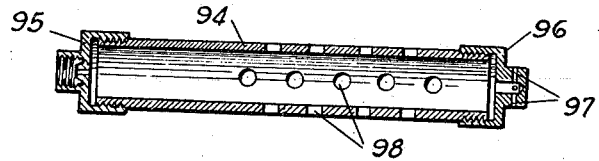
Figure 5 is a sectional view of an actuator adapted to be used in connection with the present invention and providing means for enabling the static pressure of a comparatively low head of water to be utilized to actuate the tripping mechanism described hereinafter.

The specific form of actuator which has been found to be highly effective in systems of this character is illustrated in Figure 5. It is desirable that the actuators be connected to the pressure responsive chamber by a length of small diameter small bore tubing. The difficulty heretofore encountered in transmitting the actuating pressure to the actuating mechanism by simply dipping the small bore tubing into water has been overcome by the present construction. Due to the small bore of the tubing, there is a tendency to retard the entry of the water into the tubing with a result that the tubing must be immersed to a much greater depth than desired before actuation of the mechanism can be accomplished. In this connection, it will be understood that the actuating fluid does not itself normally reach the pressure responsive chamber, but in the case of a liquid actuating fluid, the pressure is transmitted to the pressure responsive chamber by compression of the air normally contained therein and in the tubing leading to the chamber.

To overcome the resistance to the flow of the liquid in the small bore tubing, an actuator barrel 94 has been provided which is of considerably larger diameter than the small bore tubing. The actuator barrel is connected to the tubing by a coupling member 95 and is substantially closed at the other end by means of a cap 96. Perforations 98 are formed in the barrel 94 adjacent the end to which the cap 96 is secured. It is preferred that the perforations do not extend to the fitting 95 in order that a chamber may be provided adjacent this end of the actuator in which a pressure may be produced by the head of the liquid in which the actuator is immersed. The reason for capping the lower end of the barrel is to prevent actuation of the bellows due to a pressure wave caused by the barrel being placed in a rapidly moving air stream such, for example, as would be encountered if the barrel were pointed toward the nose of an aeroplane. The cap 96 is provided with radial openings 97 for draining any water which collects within the barrel and, inasmuch as these openings are radial, the wind pressure exteriorly of the barrel will not be transmitted to the interior thereof. The perforations 98 are so formed as to prevent the transmission of pressure waves to the actuating mechanism due to wind pressure externally of the barrel. To this effect the axes of the perforations preferably lie perpendicular to the axis of the barrel.

Figure 6:
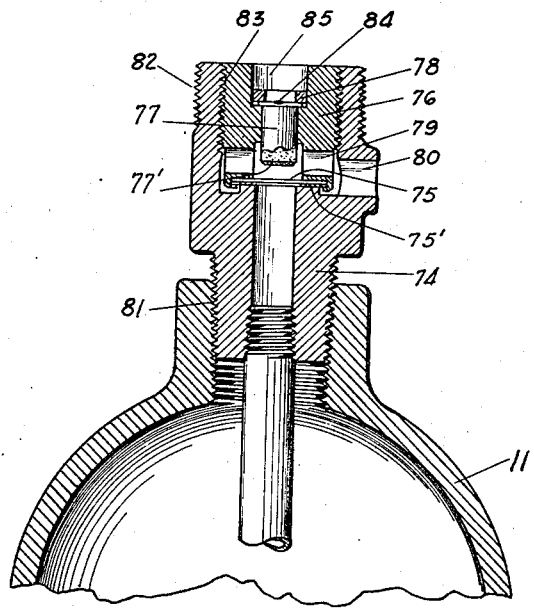
Figure 6 is a vertical sectional view of another form of projectile fluid medium release valve.

In Figure 6, in which is represented another form of projectile fluid medium release valve, a valve body is indicated by 74, a disc seal by 75, a sealing gasket by 75', and a bushing by 76, while 77 denotes a blank cartridge, adapted to fire the paper wadding 77' through the disc 75. The reference numeral 78 shows a retainer for cartridge, and 79 a horizontal radial passage formed in the bushing 76, to permit the escape of the fluid medium to an outlet passage 80 in the valve body 74. The reference numeral 81 indicates the threads by means of which the valve body is secured to the container 11, and 82 the threads for securing the device to the detonating mechanism 14, as in Figures 3 and 4. The bushing 76 is threaded into valve body 74 at 83, and is provided with a central bore 85 to expose the percussion point 84 of the cartridge to the action of a firing pin, as before. In this form of construction the paper wadding 77' of the cartridge 77 is a projectile corresponding to the projectile-cutter 30 of Figures 3 and 4, and is driven against the disc seal 75 with such force as to rupture it and release the fluid medium.

While the manner of operation of the flotation system in accordance with the present invention is not difficult to understand, it is nevertheless pointed out that, upon immersion of either the actuator 15 or the actuator 16 in water, a volume of air is trapped in the actuator and in the tubing connecting the actuator to the releasing unit 14. The pressure of the volume of air so trapped serves to move the bellows-like member 52 toward the left, as viewed in Figure 3, carrying with it the pin 72, which presses against one end of the lever 67 and causes it to disengage the lever system. When this occurs, the lever 58 rotates rapidly under the influence of the spring 63 and causes the firing pin 59 to strike the percussion cap 70 with considerable force, the detonating cap setting off the charge of explosive powder within the cartridge 41, the high pressure of the explosive gases causing the cutter assembly 30 and 31, in the construction according to Figures 3 and 4, to be forcibly detached from its support, the force of the explosion being sufficient to deform the supporting washer 37 to permit the cutter assembly to be propelled projectile-like through the frangible closure disc 28, the lower end of coupling 31 serving as a stop, cooperating with plug 29. The medium under pressure in the container is now free to escape via the openings 35 in the cutter into escape passages 45 to 48 to the conduits 21 and 21', causing the inflatable bags to be released by piston bag releases 22 and 22' and to be inflated to form buoyant floats, thus preventing the aircraft from sinking. This, of course, also holds true should the aircraft descend into the water in an inverted position. A similar action takes place in the use of the construction according to Figure 6, the paper wadding 77' being blown projectile-like out of the shell of the cartridge 77.

It will be seen that for the system to be made operable again, when the fluid releasing mechanism according to Figures 3 and 4 is used, a replacement has to be made of the disc closure 28, the supporting washer 37, and the blank cartridge 41, while the releasing lever mechanism must also be reset. This task of replacement, which ought to be done by someone specifically trained for the operation, is simplified in the form of construction shown in Figure 6, as here all of the elements to be replaced are formed into a unitary structure comprising the bushing 76, the disc closure 75, and the blank cartridge 77; so that spare units, factory built and tested, can be substituted for the used parts by simply removing the old unit and inserting the new one.

It will, of course, be readily apparent that the present invention is adaptable for other purposes than in connection with aircraft flotation gear.

From the foregoing description, it will be seen that I have provided a simple and effective means for releasing pressure fluid from one or more containers thereof, where only a small initial operating force is available, and it will be further seen that my invention accomplishes the various objects pointed out at the beginning of this specification. Finally, while my invention resides in certain principles of construction and operation which have been illustrated and described in connection with the accompanying drawings, it will be apparent to those skilled in the art that the invention may be embodied in other forms of construction without departing in any manner from the spirit and scope of the invention, and I therefore do not wish to be strictly limited to the disclosure, but rather to the scope of the appended claims.

I claim:

1. In combination, a releasing system comprising a pressure medium container, a chambered valve body closing the container, a closure opening member secured to a support within the valve body out of contact with the valve closure and adapted to open the valve, explosive means within the valve body adapted to forcibly detach the closure opening member from its support, and pressure responsive mechanism secured to the valve body and adapted to initiate an explosion in the valve.

2. In combination, a fluid medium releasing system comprising a container adapted to hold a fluid medium, a closure body on said container adapted to confine said fluid medium in the container under pressure, an outlet in the closure body, hollow closure opening means secured to a support in said closure body out of contact with the sealing closure, means defining a fluid flow connection from within said hollow opening means to said outlet, explosive means within the closure body adapted to forcibly detach the closure opening means from its support and to propel it through said seal, and a pressure responsive mechanism adapted to actuate said explosive means, whereby the fluid medium is released to pass through the hollow closure opening means to the outlet.

3. In an interchangeable valved container structure, the combination of a container, a closure body, a closure member for the container within the closure body, a projectile closure opener secured out of contact with said closure body to a support within the closure body, and explosive means within the closure body accessible to actuation from outside the closure body to detach the projectile from its support, the projectile and the explosive means being structurally joined to form a unitary self-contained interchangeable structure with respect to the closure body and the explosion-initiating means.

4. In an interchangeable valved container structure, the combination of a container, a chambered body threadedly secured to the container, a frangible disc seal, a seal opening member in form of a projectile supported out of contact with the seal and the body within the chambered body, and an explosive cartridge within the chambered body being accessible to actuation from outside the chambered body to forcibly detach the seal opening member from its support, the seal opening member and cartridge being structurally joined to form a unitary interchangeable structure.

5. In an explosion valve, the combination of a chambered valve body having inlet and outlet passages, a closure member secured in the valve body separating said passages, a closure opening member supported in said valve chamber out of contact with said closure, a cartridge within said valve chamber, accessible to mechanical actuation from outside said chamber, whereby, following said actuation, the force of explosion detaches the closure opening member from its support and propels it through the closure member, communication thereby being effected between the inlet and outlet passages, the closure opening member and the cartridge being structurally joined to form a unitary interchangeable structure relative to said valve body and the outside cartridge actuating means.

6. A releasing device, comprising a chambered valve body having inlet and outlet passages, a closure member secured in the valve body separating said passages, a closure opening member supported out of contact with said closure member in said valve chamber, a cartridge within said valve chamber, the explosion of which forcibly detaches the closure opening member from its support and propels it through the closure member, communication thereby being effected between the inlet and outlet passages, and primary motivating force multiplying means secured to the valve body adapted to transmit a force to actuate said cartridge.

7. In an explosion valve, a chambered valve body having inlet and outlet passages, a bushing in said valve body, a disc closure secured to said bushing, and a blank cartridge supported opposite to the disc closure in said bushing and adapted to be detonatingly struck from the outside to thereby open said closure.

8. In an explosion actuated fluid releasing device, a chambered body member having inlet and outlet passages, a frangible closure in said body, supporting means in said body, a projectile-cutter in said chamber adapted to be supported by said supporting means to hold the projectile-cutter out of contact with the frangible closure, and a blank cartridge in said body member adjacent said projectile-cutter, said blank cartridge being adapted to be detonated by means extending into said supporting means to forcibly detach the projectile-cutter from said supporting means and propel it through the frangible closure.

9. In an explosion actuated fluid releasing device, a chambered body member having inlet and outlet passages, a frangible closure in said body, supporting means in said body including a frangible disc having a central aperture, a projectile-cutter in said chamber extending through said aperture and having a flange adapted to rest on said frangible disc to hold the projectile-cutter out of contact with the frangible closure, and a blank cartridge in said body member adjacent said projectile-cutter, said blank cartridge being adapted to be detonated by means extending into said supporting means to cause the projectile-cutter to tear through the frangible disc and be propelled through the frangible closure.

10. In an explosion actuated fluid releasing device, a chambered body member having inlet and outlet passages, a frangible closure in said body, supporting means in said body including a frangible disc having a central aperture and means to secure said frangible disc in said body member, a projectile-cutter in said chamber extending through said aperture and having a flange adapted to rest on said frangible disc to hold the projectile-cutter out of contact with the frangible closure, and a blank cartridge held in said securing means adjacent said projectile-cutter, said blank cartridge being adapted to be detonated by means extending into said securing means to cause the projectile-cutter to tear through the frangible disc and be propelled through the frangible closure.

11. In an explosion actuated fluid releasing device, a chambered body member having inlet and outlet passages, a frangible closure in said body, a blank cartridge in said body comprising a shell, an explosive charge, and a charge retaining element; and means to secure the blank cartridge in the body member, said blank cartridge being adapted to be detonated by means extending into said securing means to cause the charge retaining element to be forcibly detached from the shell and propelled through the frangible closure.

12. An explosion actuated fluid releasing device comprising a chambered body member having inlet and outlet passages, and a replaceable unitary structure associated with the body member comprising a supporting member, a frangible closure carried by the supporting member and supported over the inlet passage, a blank cartridge in said supporting member comprising a shell, an explosive charge, and a charge retaining element; and means to secure the blank cartridge in the supporting member, said blank cartridge being adapted to be detonated by means extending into said securing means to cause the charge retaining element to be forcibly detached from the shell and propelled through the frangible closure.

13. In an exchangeable valved container structure, the combination of a container of fluid, a closure body therefor having a frangible closure and fluid inlet and outlet passages, a projectile adapted to be secured to a support within the closure body, and explosive means within the closure body adapted to be actuated by explosion-initiating means to detach the projectile from its support and to propel the projectile through the frangible closure, the whole being adapted to form a unitary self-contained exchangeable structure relative to the explosion-initiating means.

14. In an exchangeable valved container structure, the combination of a container of fluid, a closure body secured to the container and provided with inlet and outlet passages, a frangible closure, a closure opening member adapted to be secured to a support within the closure body and to be propelled through the closure, and an explosive cartridge within the closure body adapted to be detonatingly struck from outside the closure body and to forcibly detach the closure opening member from its support, the whole being adapted to form a unitary exchangeable structure relative to the detonating means.

HARRY CAMPBELL GRANT, Jr.